(12) United States Patent
Okamoto et al.

(10) Patent No.: US 6,828,408 B2
(45) Date of Patent: Dec. 7, 2004

(54) AROMATIC POLYIMIDE ESTER AND METHOD FOR PRODUCING THEREOF

(75) Inventors: Satoshi Okamoto, Ibaraki (JP); Manabu Hirakawa, Ibaraki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/234,709

(22) Filed: Sep. 5, 2002

(65) Prior Publication Data

US 2003/0083459 A1 May 1, 2003

(30) Foreign Application Priority Data

Sep. 10, 2001 (JP) ........................ 2001-273196

(51) Int. Cl.$^7$ .................... C08G 73/16; C08G 63/00

(52) U.S. Cl. .................. 528/170; 528/171; 528/172; 528/173; 528/176; 528/272; 528/274; 528/289; 528/322; 528/350; 528/352; 528/353; 528/183; 528/185; 528/189; 528/193

(58) Field of Search .................. 528/170–173, 528/183, 185, 176, 272, 189, 193, 274, 289, 322, 350, 352–353, 310, 332

(56) References Cited

U.S. PATENT DOCUMENTS

| | | | |
|---|---|---|---|
| 5,003,030 A | | 3/1991 | Hayashi et al. |
| 5,155,204 A | * | 10/1992 | Parodi et al. ............... 528/193 |
| 6,610,815 B1 | * | 8/2003 | Hata et al. .................. 528/310 |

FOREIGN PATENT DOCUMENTS

| | | |
|---|---|---|
| JP | 8-16155 | 2/1996 |
| JP | 8-19236 | 2/1996 |
| JP | 8-19237 | 2/1996 |

* cited by examiner

*Primary Examiner*—P. Hampton Hightower
(74) *Attorney, Agent, or Firm*—Foley & Lardner LLP

(57) ABSTRACT

An aromatic polyimide ester having a small coefficient of linear expansion, small water absorbing property, and excellent heat resistance. The aromatic polyimide ester comprising: a repeating unit represented by a following formula (I),

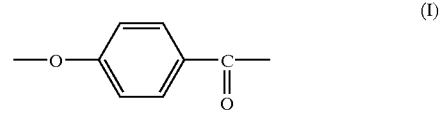

(I)

a repeating unit represented by a following formula (II),

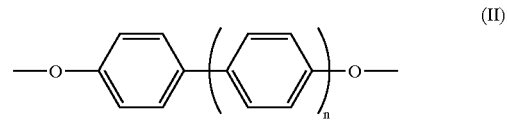

(II)

(n represents 0 or 1)
a repeating unit represented by a following formula (III),

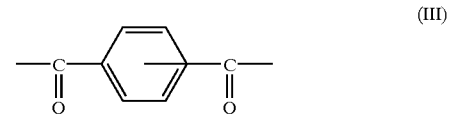

(III)

and a repeating unit represented by a following formula (IV),

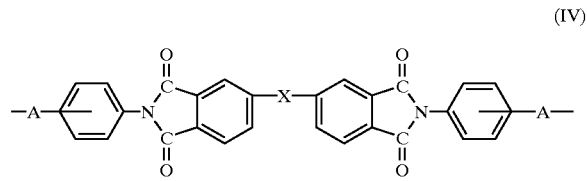

(IV)

(-A- represents —O— or —CO—, and is located in para-position or meta position to imido group, and X represents direct coupling, —O—, —S—, or —SO$_2$—) and the repeating units are mutually bonded with each other through ester-bonds.

6 Claims, No Drawings

AROMATIC POLYIMIDE ESTER AND METHOD FOR PRODUCING THEREOF

CROSS-REFERENCE TO RELATED PATENT APPLICATIONS

Japan Priority Application 2001-273196, filed Sep. 10, 2001 including the specification, drawings, claims and abstract, is incorporated herein by reference in its entirety.

FIELD OF THE INVENTION

The present invention relates to an aromatic polyimide ester and a method for producing thereof.

BACKGROUND OF THE INVENTION

In recent years, various engineering plastics are being developed, and especially; a thermotropic liquid crystalline polymer showing an optical anisotropy in molten state, and excellent mechanical property by having a mesogenic structure with highly oriented shows excellent moldability.

The liquid crystalline polymer is oriented by injection molding, and therefore, a coefficient of linear expansion in machine direction (MD) is very small, but a coefficient of linear expansion in a direction transverse to flow direction (TD) shows an approximately as large as coefficient of linear expansion of thermoplastic resins. Accordingly a dimensional stability in transverse direction was not necessarily satisfactory.

On the other hand, as resins having a small coefficient of linear expansion, polyimide resins were known, but it has a water absorbing property.

As such resins that have feature of both a liquid crystalline polymer and polyimide resin, polyimide ester resins having imide bond and ester bond in a polymer molecule are known (Japanese Patent Publication No. 8-16155 B, Japanese Patent Publication No. 8-19236 B, and Japanese Patent Publication No. 8-19237 B). Although polyimide ester resins have excellent property of having a small coefficient of linear expansion and small water absorbing property; they have poor heat resistance, and therefore they tend to decompose by heat when melting process was carried out.

SUMMARY OF THE INVENTION

An object of the present invention is to provide an aromatic polyimide ester having a small coefficient of linear expansion and small water absorbing property, and moreover excellent heat resistance.

The present inventors found that a polyimide ester in which a repeating unit of a formula (IV) is ester-bonded in addition to repeating units of following formulas (I), (II), and (III), has a small expansion coefficient and small water absorbing property; and moreover excellent heat resistance, and thus the present invention was completed.

Namely, the present invention provides an aromatic polyimide ester comprising:

a repeating unit represented by a following formula (I), (I)

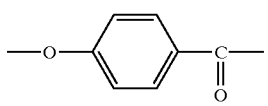

a repeating unit represented by a following formula (II), (II)

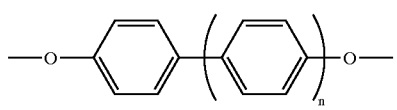

(n represents 0 or 1)

a repeating unit represented by a following formula (III), (III)

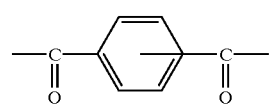

and a repeating unit represented by a following formula (IV)

(IV)

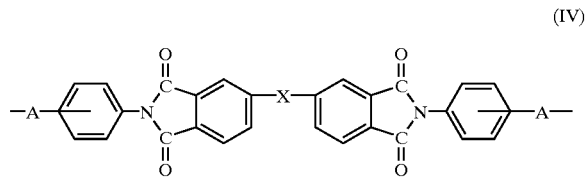

(in the formulas, -A- represents —O— or CO—, and is located in para-position or in meta position to an imide group, and X represents direct coupling, —O—, or —SO$_2$—.), and all of the said repeating units mutually bonded with each other through ester-bonds.

Reference designator n in the formula (II) represents 0 or 1. A preferable repeating unit represented by the formula (II) is as follows;

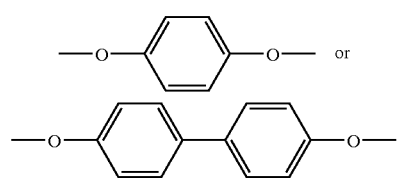 or

An aromatic polyimide ester of the present invention may include either of the units among them, and may include both of them by arbitrary ratios, and in view of a heat-resistance of resulted aromatic polymide, preferably may include only

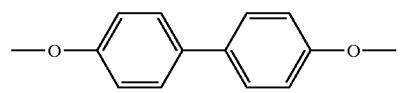

wherein n in the formula (II) is 1.

A prefereable repeating unit represented by the formula (III) is following unit;

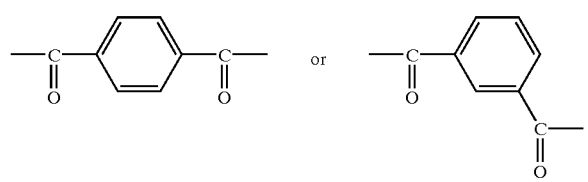

An aromatic polyimide ester of the present invention may include either units among them, and also may include both of them by arbitrary ratios.
Preferable repeating units represented by the formula (Iv) are the following repeating units wherein -A- is —CO—;
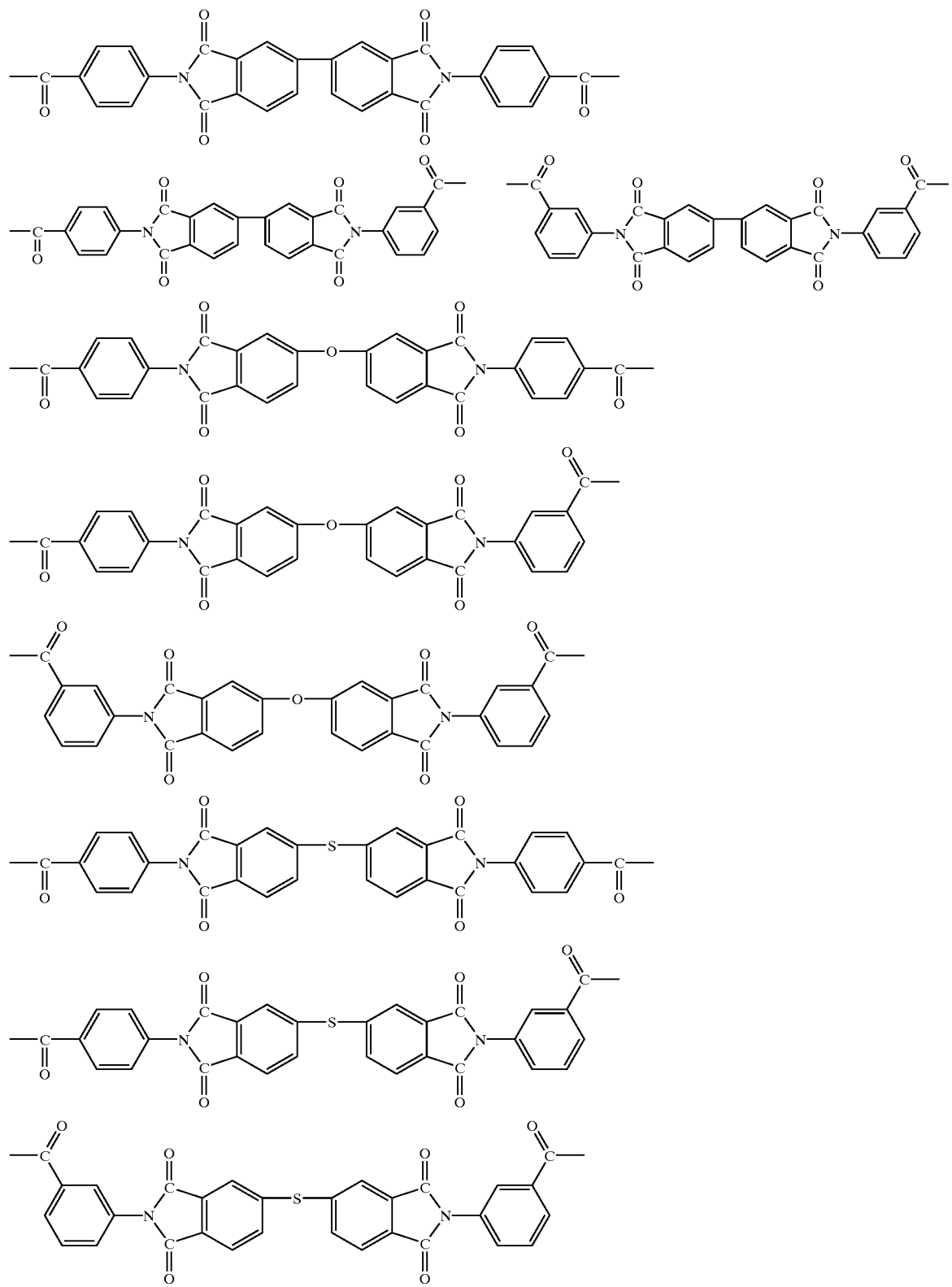

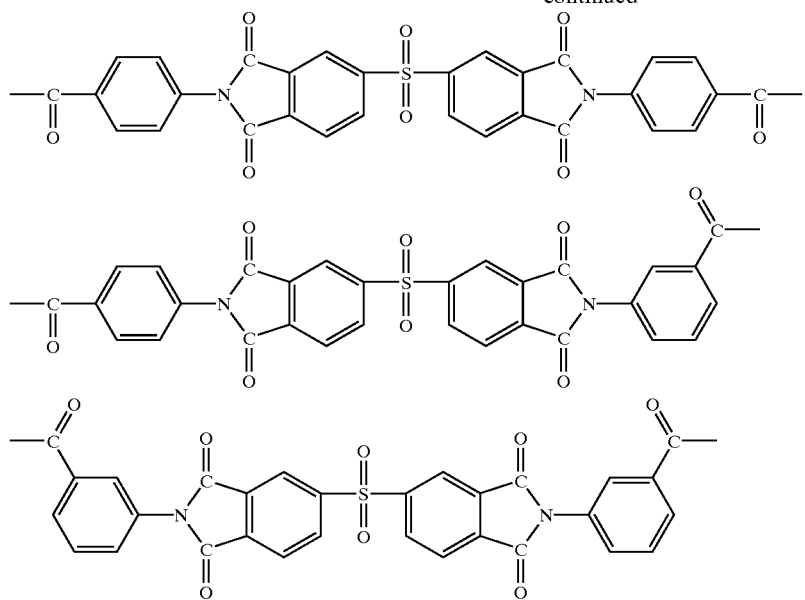

More repeating units represented by the formula IV) are the following units, wherein -A- is —O-preferable repeating units represented by the formula (IV) are the following repeating units, when -A- is —CO—.

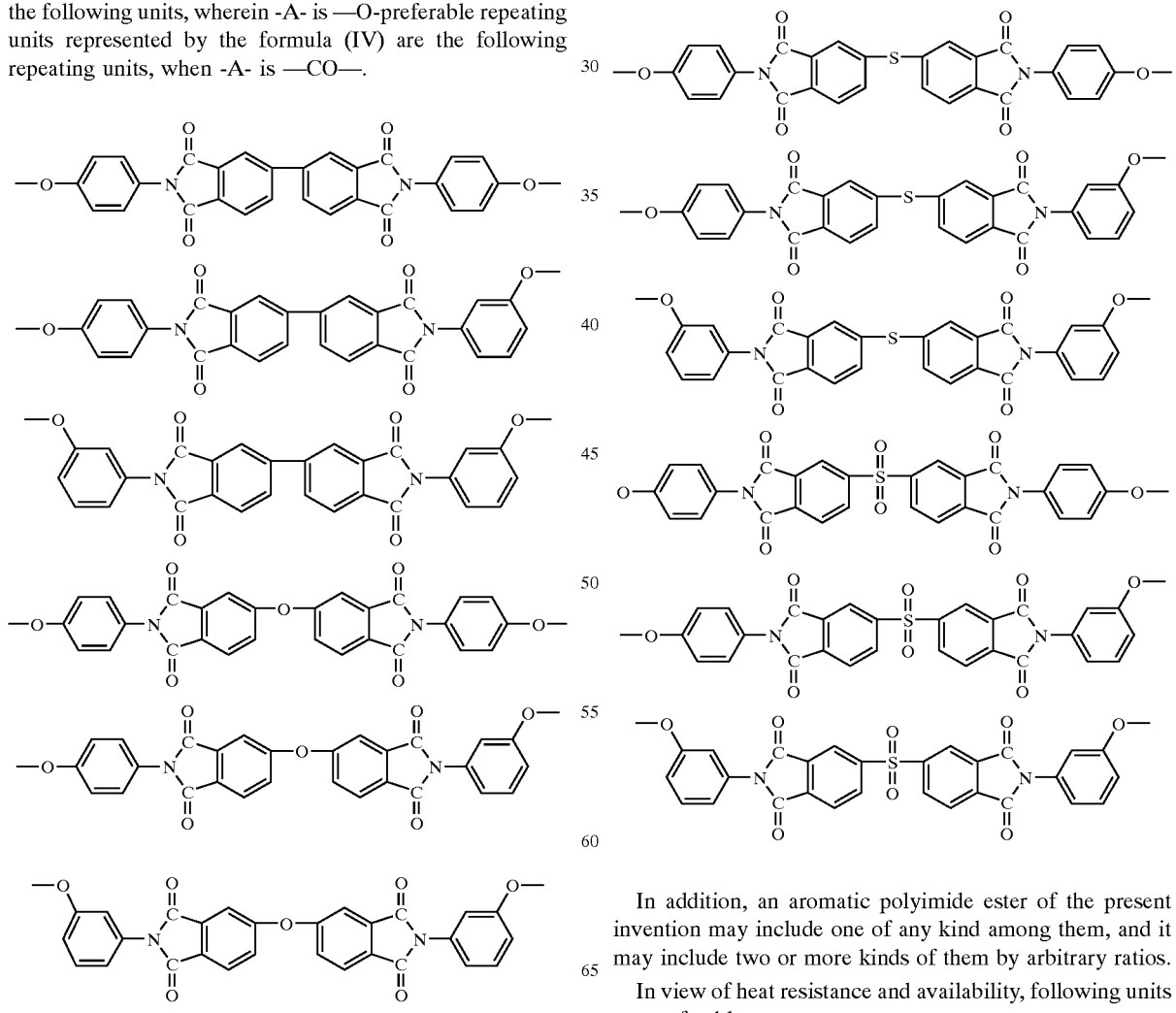

In addition, an aromatic polyimide ester of the present invention may include one of any kind among them, and it may include two or more kinds of them by arbitrary ratios.

In view of heat resistance and availability, following units are preferable.

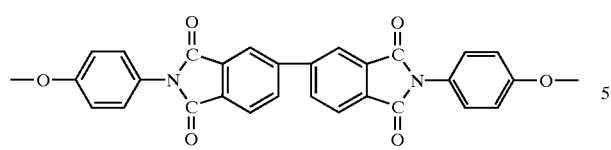

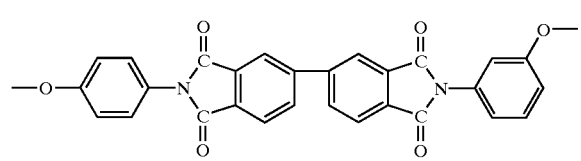

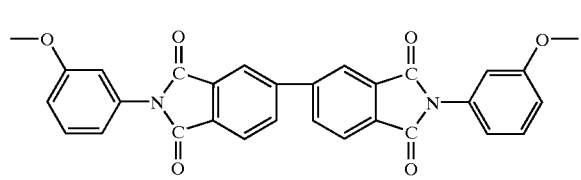

A mole ratio of repeating units in an aromatic polyimide ester of the present invention is preferably (I)/((II)+(III)+(IV)) is 30/70 to 90/10, more preferably 40/60 to 80/20, and still more preferably 50/50 to 70/30. And it is preferable that (IV)/((I)+(II)+(III)) is 0.9/99.9 to 30/70, more preferably 0.5/99.5 to 20/80, and still more preferably 1/99 to 10/90.

When the mole ratio of the repeating unit is out of the above-mentioned range, heat resistance of aromatic polyimide may be deteriorated.

An aromatic polyimide ester of the present invention may be produced by the following methods. An aromatic polyimide ester of the present invention may be produced, for example, by reacting a compound represented by a following formula (I'),

($Y_1$ represents a hydrogen atom or $R_1$ CO)— ($R_1$ represents a hydrocarbon group with carbon numbers of 1 to 4), $Z_1$ represents a hydrogen atom or a hydrocarbon group with carbon numbers of 1 to 4)

a compound represented by a following formula (II'),

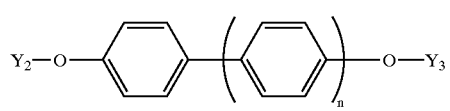

(n represents 0 or 1, $Y_2$ represents a hydrogen atom or $R_2$CO(where $R_2$ represents a hydrocarbon group with a carbon number of 1 to 4), $Y_3$ represents a hydrogen atom or $R_3$CO— (where $R_3$ represents a hydrocarbon group with carbon numbers of 1 to 4))

a compound represented by a following formula (III'),

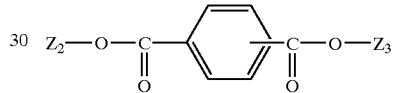

($Z_2$ and $Z_3$ represent independently a hydrogen atom or a hydrocarbon group with carbon numbers of 1 to 4 respectively, and $Z_3$-O— CO-group is located in para-position or in meta position to $Z_2$—O—CO-group) and a compound represented by a following formula (IV'-1, (IV'-2), or

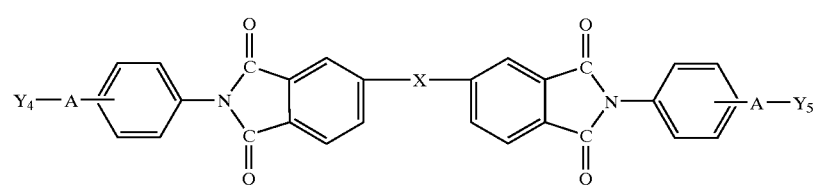

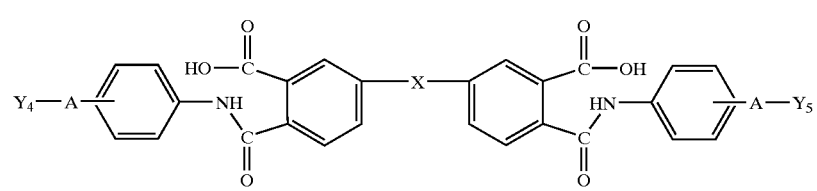

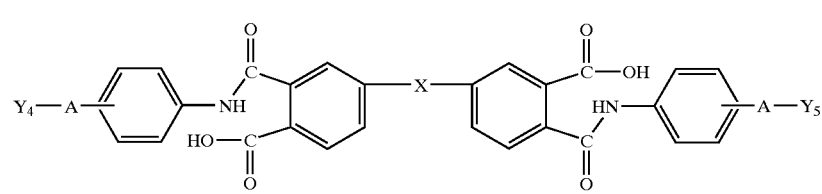

($Y_4$ represents a hydrogen atom or $R_4CO$— (where $R_4$ represents a hydrocarbon group with carbon numbers of 1 to 4), $Y_5$ represents a hydrogen atom or $R_5CO$— (where $R_5$ represents a hydrocarbon group with carbon numbers of 1 to 4), and $Y_4$-A-group is located in para-position or in meta position to $Y_5$-A-group.)

In a mole ratio of each compounds, (I')/[(II')+(III')+{one of (IV'-1), (IV'-2) or (IV'-3)}] is preferably 30/70 to 90/10, more preferably 40/60 to 80/20, and still more preferably 50/50 to 70/30. And it is referable that {one of (IV'-1), (IV'-2) or (IV'3)}/((I')+((II')+(III') is preferably 0.1/99.9 to 30/70, more preferably 0.5/99.5 to 20/80, and still more preferably 1/99 to 10/90.

In the above-mentioned formulas (I'), (II'), (III'), (IV'-1), (IV'-2), and (IV'-3), $Y_1$ represents a hydrogen atom or $R_1CO$—, $Y_2$ a hydrogen atom or $R_2CO$—, $Y_4$ a hydrogen atom or $R_3CO$—, $Y_4$ a hydrogen atom or $R_3CO$—, and $Y_5$ a hydrogen atom or $R_4CO$—, respectively.

Here, $R_1$, $R_2$, $R_3$, $R_4$, and $R_5$ represent a hydrocarbon group with carbon numbers of 1 to 4, respectively. These hydrocarbon groups involve methyl group, ethyl group, n-propyl group, isopropyl group, n-butyl group, sec-butyl, tert-butyl, etc. for example, and methyl group is preferable.

In addition, all of $R_1$, $R_2$, $R_3$, $R_4$, and $R_5$ may be the same, some of them may be the same and others may be different, or all of them may be mutually different from others.

$Z_1$, $Z_2$, $Z_3$, $Z_4$, and $Z_5$ represent a hydrogen atom or a hydrocarbon group with carbon numbers of 1 to 4, respectively. As the hydrocarbon group, the same as the above-mentioned groups may be mentioned. As $Z_1$, $Z_2$, $Z_3$, $Z_4$, and $Z_5$, a hydrogen atom is preferable. In addition, all of $Z_1$, $Z_2$, $Z_3$, $Z_4$, and $Z_5$ may be the same, some of them may be the same and others may be different, or all of them may be mutually different from others.

As compound represented by the formula (I'), 4-acyloxy benzoic acid obtained by acylating 4-hydroxy benzoic acid using $R_1COOH$ ($R_1$ represents the same group as the above-mentioned groups) or derivative thereof, 4-hydroxy benzoate ester or 4-acyloxy benzoate ester obtained by esterification of 4-hydroxy benzoic acid or 4-acyloxy benzoic acid with $Z_1OH$ ($Z_1$ represents the same group as the above-mentioned groups) may be mentioned.

As examples of a compound represented by the formula (I'), for example, 4-hydroxy benzoic acid, 4-hydroxy methyl benzoate, 4-hydroxy ethyl benzoate, 4-hydroxy butyl benzoate, etc. may be mentioned, and 4 hydroxy benzoic acid and 4-acetoxy benzoic acid are preferable.

These compounds may be used independently, or in combination of two or more kinds of them.

As examples of a compound represented by the formula (II'), for example, 4-acyloxy phenols, such as hydroquinone, 4-acetoxy phenol, and 4-propionyl oxy phenol; 1,4-diacyloxy benzenes, such as 1,4diacetoxy benzene; 4'-acyloxy-4-hydroxy biphenyls, such as 4,4'-dihydroxy biphenyl, and 4'-acetoxy-4-hydroxy biphenyl; 4,4'-diacyloxy biphenyl, such as 4,4'-diacetoxy biphenyl may be mentioned. Among them, 4,4'-dihydroxy biphenyl and 4,4'diacetoxy biphenyl are preferable.

These compounds may be used independently, or in combination of two or more kinds of them.

As compounds represented by the formula (III'), for example, compounds obtained by esterifying terephthalic acid and isophthalic acid, or each of them using $Z_2OH$, or $Z_3OH$ ($Z_2$ and $Z_5$ represent the same group as the above-mentioned groups) may be mentioned.

As examples of a compound represented by the formula (III'), for example, terephthalic acid monoesters, such as terephthalic acid, isophthalic acid, monomethyl terephthalate, monoethyl terephthalate, monopropyl terephthalate, and monobutyl terephthalate; terephthalic acid diesters, such as a dimethyl terephthalate, diethyl terephthalate, dipropyl terephthalate, and dibutyl terephthalate; isophthalic acid monoesters, such as monomethyl isophthalate, monoethyl isophthalate, monopropyl isophthalate, and monobutyl isophthalate; isophthalic acid diesters, such as dimethyl isophthalate, diethyl isophthalate, dipropyl isophthalate, and dibutyl isophthalate, etc. may be mentioned. Among them, terephthalic add and an isophthalic acid are preferable.

These compounds may be used independently, or in combination of two or more kinds of them.

As examples of a compound represented by the formula (IV'-1), for example, following compounds may be mentioned; N-(4-hydroxy phenyl or 4-acyloxy phenyl)-N'-(4-hydroxy phenyl or 4-acyloxy phenyl) -biphenyl-3,4,3',4'-tetra carboxylic acid diimides, such as, N,N'-bis(4-hydroxy phenyl)-biphenyl-3,4,3',4'-tetra carboxylic acid diimide, N,N'bis(4-acetoxy phenyl)-biphenyl-3,4,3',4'-tetra carboxylic acid diimide, N,N'-bis(4-propionyl oxy phenyl)-biphenyl-3,4,3',4'-tetra carboxylic acid diimide, N-(4-hydroxy phenyl)-N'-(4-acetoxy phenyl)-biphenyl-3,4,3', 4'-tetra carboxylic acid diimide; N-(3-hydroxy phenyl or 3-acyloxy phenyl)-N'(3-hydroxy phenyl or 3- acyloxy phenyl)-biphenyl-3,4,3',4'-tetra carboxylic acid diimide, such as, N,N'-bis(3-hydroxy phenyl)-biphenyl-3,4,3',4'-tetra carboxylic acid diimide, N,N'-bis(3-acetoxy phenyl)-biphenyl-3,4,3',4'-tetra carboxylic acid diimide, N,N'-bis(3-propionyl oxy phenyl)-biphenyl3,4,3',4'-tetra carboxylic acid diimide, N-(3-hydroxy phenyl)-N'-(3-acetoxy phenyl)-biphenyl-3,4,3',4'-tetra carboxylic acid diimide; N-(4-hydroxy phenyl or 4-acyloxy phenyl)-N'-(3-hydroxy phenyl or 3-acyloxy phenyl)biphenyl-3,4,3',4'-tetra carboxylic acid diimide, such as, N-(4-hydroxy phenyl)-N'-(3-acetoxy phenyl)-biphenyl-3,4,3',4'-tetra carboxylic acid diimide, N-(4-acetoxy phenyl)-N'-(3-acetoxy phenyl)-biphenyl-3,4, 3', 4'-tetra carboxylic acid diimide, N-(4-hydroxy phenyl)-N'-(3-acetoxy phenyl)15 biphenyl-3,4,3',4'-tetra carboxylic acid diimide; N-(4-hydroxy phenyl or 4-acyloxy phenyl)-N'-(4-hydroxy phenyl or 4-acyloxy phenyl)-phenyl ether -3,4,3',4'-tetra carboxylic acid diimide, such as, N,N'-bis(4-hydroxy phenyl)-phenyl ether-3,4,3,4'-tetra carboxylic acid diimide, N,N'-bis(4-acetoxy phenyl)-phenyl ether-3,4,3',4'-tetra carboxylic acid diimide, N,N'-bis(4-propionyl oxy phenyl)-phenyl ether-3,4,3',4'-tetra carboxylic acid diimide, N-(4-hydroxy phenyl)-N'-(4-acetoxy phenyl)-phenyl ether -3,4,3',4'-tetra carboxylic acid diimide; N-(3-hydroxy phenyl or 3-acyloxy phenyl)-N'-(3-hydroxy phenyl or 3-acyloxy phenyl)-phenyl ether-3,4,3',4'-tetra carboxylic acid diimide, such as, N,N'-bis(3-hydroxy phenyl)-phenyl ether-3,4,3',4'-tetra carboxylic acid diimide, N,N'-bis(3-acetoxy phenyl) phenyl ether-3,4,3',4'-tetra carboxylic acid diimide, N,N'-bis (3-propionyl oxy phenyl)-phenyl ether-3,4,3',4'-tetra carboxylic acid diimide, N-(3-hydroxy phenyl)-N'-(3-acetoxy phenyl)-phenyl ether-3,4,3', 4'-tetra carboxylic acid diimide; N-(4-hydroxy phenyl or 4-acyloxy phenyl)-N'-(3-hydroxy phenyl or 3-acyloxy phenyl)-phenyl ether-3,4,3',4'-tetra carboxylic acid diimide, such as, N-(4-hydroxy phenyl)-N'-(3-acetoxy phenyl)-phenyl ether 3,4,3',4'-tetra carboxylic acid diimide, N-(4-acetoxy phenyl)-N'-(3-acetoxy phenyl)-phenyl ether-3,4,3',4'-tetra carboxylic acid diimide, N-(4-hydroxy phenyl)-N'-(3-acetoxy phenyl)-phenyl ether -3,4,3',4'-tetra carboxylic acid diimide; N-(4-hydroxy phenyl or 4-acyloxy phenyl)-N'-(4-hydroxy phenyl or 4-acyloxy phenyl)-phenyl sulfide-3,4,3',4'-tetra carboxylic acid diimide, such as, N,N'-bis(4-hydroxy phenyl)-phenyl sulfide-3,4,3',4'-tetra carboxylic acid diimide, N,N'-bis(4-acetoxy phenyl)-phenyl sulfide-3,4,3',4'-tetra carboxylic acid diimide, N,N'-bis(4-propionyl oxy phenyl)-phenyl sulfide-3,4,3',4'-tetra carboxylic acid diimide, N-(4-hydroxy phenyl)-N'-(4-acetoxy phenyl)-phenyl sulfide -3,4, 3',4'-tetra carboxylic acid diimide; N-(3-hydroxy phenyl or 3-acyloxy phenyl)-N'-(3-hydroxy phenyl or 3-acyloxy phenyl)-phenyl sulfide -3,4,3',4'-tetra carboxylic acid diimide, such as, N,N'-bis(3-hydroxy phenyl)-phenyl sulfide-3,4,3',4'-tetra carboxylic acid diimide, N,N'-bis(3-acetoxy phenyl)-phenyl sulfide-3,4,3',4'-tetra carboxylic acid diimide, N,N'-bis(3-propionyl oxy phenyl)-phenyl sulfide-3,4,3',4'-tetra carboxylic acid diimide, N-(3-hydroxy phenyl)-N'-(3-acetoxy phenyl)-phenyl sulfide-3,4,3',4'-tetra carboxylic acid diimide; N-(4-hydroxy phenyl or 4-acyloxy phenyl)-N'-(3-hydroxy phenyl or 3-acyloxy phenyl)-phenyl sulfide -3,4,3',4'-tetra carboxylic acid diimide, such as, N-(4-hydroxy phenyl)-N'(3-acetoxy phenyl)-phenyl sulfide-3,4, 3',4'-tetra carboxylic acid diimide, N-(4-acetoxy phenyl)-N'-(3-acetoxy phenyl)-phenyl sulfide-3,4,3',4'-tetra carboxylic acid diimide, N-(4-hydroxy phenyl)-N'-(3-acetoxy phenyl) phenyl sulfide-3,4,3',4'-tetra carboxylic acid diimide; N,N'-bis(4-hydroxy phenyl)-phenyl sulfone-3,4,3',4'-tetra carboxylic acid diimide, N,N'-bis(4-acetoxy phenyl)-phenyl sulfone-3,4,3',4'-tetra carboxylic acid diimide, N,N'-bis(4-propionyl oxy phenyl)-phenyl sulfone-3,4,3',4'-tetra carboxylic acid diimide, N-(4-hydroxy phenyl)-N'-(4-acetoxy phenyl)-phenyl sulfone-3,4,3',4'-tetra carboxylic acid diimide; N-(3-hydroxy phenyl or 3-acyloxy phenyl)-N'-(3-hydroxy phenyl or 3-acyloxy phenyl)-phenyl sulfone-3,4,3', 4'-tetra carboxylic acid diimide, such as, N,N'-bis(3-hydroxy phenyl)-phenyl sulfone-3,4,3',4'-tetra carboxylic acid diimide, N,N'-bis(3-acetoxy phenyl)-phenyl sulfone-3,4,3', 4'-tetra carboxylic acid diimide, N,N'-bis(3-propionyl oxy phenyl)-phenyl sulfone-3,4,3',4'-tetra carboxylic acid diimide, N-(3-hydroxy phenyl)-N'-(3-acetoxy phenyl)-phenyl sulfone-3,4,3',4'-tetra carboxylic acid diimide; N-(4-hydroxy phenyl or 4-acyloxy phenyl)-N'-(3-hydroxy phenyl or 3-acyloxy phenyl)-phenyl sulfone-3,4,3',4'-tetra carboxylic acid diimide, such as, N-(4-hydroxy phenyl)-N'(3-acetoxy phenyl)-phenyl sulfone-3,4,3',4'-tetra carboxylic acid diimide, N-(4-acetoxy phenyl)-N'-(3-acetoxy phenyl)-phenyl sulfone-3,4,3',4'-tetra carboxylic acid diimide, N-(4-hydroxy phenyl)-N'-(3-acetoxy phenyl)phenyl sulfone-3,4, 3', 4'-tetra carboxylic acid diimide; N-(4-carboxy phenyl or 4-alkoxy phenyl)-N'-(4-carboxy phenyl or 4-alkoxy phenyl)-biphenyl-3,4,3',4'-tetra carboxylic acid diimide, such as, N,N'-bis(4-carboxy phenyl)-biphenyl-3,4,3',4'-tetra carboxylic acid diimide, N,N'-bis(4-methoxy carbonyl phenyl)-biphenyl-3,4,3',4'-tetra carboxylic acid diimide, N,N'-bis(4-ethoxy carbonyl phenyl)-biphenyl-3,4,3',4'-tetra carboxylic acid diimide, N-(4-carboxy phenyl)-N'-(4-methoxy carbonyl phenyl)-biphenyl-3,4,3',4'-tetra carboxylic acid diimide N-(3-carboxy phenyl or 3-alkoxy phenyl)-N'-(3-carboxy phenyl or 3-alkoxy phenyl)-biphenyl-3,4,3', 4'-tetra carboxylic acid diimide, such as, N,N'-bis(3-carboxy phenyl)-biphenyl-3,4,3',4'-tetra carboxylic acid diimide, N,N'-bis(3-methoxy carbonyl phenyl)-biphenyl-3,4,3',4'-tetra carboxylic acid diimide, N,N'-bis(3-ethoxy carbonyl phenyl)-biphenyl-3,4,3',4'-tetra carboxylic acid diimide, N-(3-carboxy phenyl)-N'-(3-methoxy carbonyl phenyl)-biphenyl-3,4,3',4'-tetra carboxylic acid diimide; N-(4-carboxy phenyl or 4-alkoxy phenyl)-N'-(3-carboxy phenyl or 3-alkoxy phenyl)biphenyl-3,4,3',4'-tetra carboxylic acid diimide, such as N-(4-carboxy phenyl)-N'-(3-carboxy phenyl)-biphenyl-3,4,3',4'-tetra carboxylic acid diimide, N-(4-methoxy carbonyl phenyl)-N'-(3-methoxycarbonyl phenyl)biphenyl-3,4,3',4'-tetra carboxylic acid diimide, N-(4-carboxy phenyl)-N'(3-methoxycarbonyl phenyl)-biphenyl-3,4,3',4'-tetra carboxylic acid diimide; N-(4-carboxy phenyl or 4-alkoxy phenyl)-N'-(4-carboxy phenyl or 4-alkoxy phenyl)-phenyl ether-3,4,3',4'-tetra carboxylic acid diimide, such as, N,N'-bis(4-carboxy phenyl)-phenyl ether-3,4,3',4'-tetra carboxylic acid diimide, N,N'-bis(4-methoxycarbonyl phenyl)-phenyl ether-3,4,3',4'-tetra carboxylic acid diimide, N,N'-bis(4-ethoxy carbonyl phenyl)-phenyl ether-3,4,3',4'-tetra carboxylic acid diimide, N-(4-carboxy phenyl)-N'-(4-methoxy carbonyl phenyl)-phenyl ether-3,4,3',4'-tetra carboxylic acid diimide N-(3-carboxy phenyl or 3-alkoxy phenyl)-N'-(3-carboxy phenyl or 3-alkoxy phenyl)-phenyl ether-3,4,3',4'-tetra carboxylic acid diimide, such as, N,N'-bis(3-carboxy phenyl)-phenyl ether-3,4,3',4'-tetra carboxylic acid diimide, N,N'-bis(3-methoxy carbonyl phenyl)-phenyl ether 3,4,3',4'-tetra carboxylic acid diimide, N,N'-bis(3-ethoxy carbonyl phenyl)-phenyl ether-3,4,3',4'-tetra carboxylic acid diimide, N-(3-carboxy phenyl)-N'-(3-methoxy carbonyl phenyl)-phenyl ether-3,4, 3',4'-tetra carboxylic acid diimide; N-(4-carboxy phenyl or 4-alkoxy phenyl)-N'-(3-carboxy phenyl or 3-alkoxy phenyl)-phenyl ether-3,4,3',4'-tetra carboxylic acid diimide, such as, N-(4-carboxy phenyl)-N'-(3-carboxy phenyl)-phenyl ether-3,4,3',4'-tetra carboxylic acid diimide, N-(4-methoxycarbonyl phenyl)-N'-(3-methoxycarbonyl phenyl)-phenyl ether-3,4,3',4'-tetra carboxylic acid diimide, N-(4-carboxy phenyl-N'-(3-methoxy carbonyl phenyl)-phenyl ether-3,4,3',4'-tetra carboxylic acid diimide N-(4-carboxy phenyl or 4-alkoxy phenyl)-N'-(4-carboxy phenyl or 4-alkoxy phenyl)-phenyl sulfide-3,4,3',4'-tetra carboxylic acid diimide, such as, N,N'-bis(4-carboxy phenyl)-phenyl sulfide-3,4,8',4'-tetra carboxylic acid diimide, N,N'-bis (4methoxycarbonyl phenyl)-phenyl sulfide-3,4,3',4'-tetra carboxylic acid diimide, N,N'-bis(4-ethoxy carbonyl phenyl)-phenyl sulfide-3,4,3',4'-tetra carboxylic acid diimide, N-(4-carboxy phenyl)-N'-(4-methoxy carbonyl phenyl)-phenyl sulfide-3,4,3',4'-tetra carboxylic acid diimide; N-(3-carboxy phenyl or 3-alkoxy phenyl)-N'(3-carboxy phenyl or 3-alkoxy phenyl)phenyl sulfide-3,4,3',4'-tetra carboxylic acid diimide, such as, N,N'-bis(3-carboxy phenyl)-phenyl sulfide-3,4,3',4'-tetra carboxylic acid diimide, N,N'-bis(3-methoxycarbonyl phenyl)-phenyl sulfide-3,4,3',4'-tetra carboxylic acid diimide, N,N'-bis(3-ethoxy carbonyl phenyl)-phenyl sulfide-3,4,3', 4'-tetra carboxylic acid diimide, N-(3-carboxy phenyl)-N'-(3 methoxy carbonyl phenyl)-phenyl sulfide-3,4,3',4'-tetra carboxylic acid diimide; N-(4-carboxy phenyl or 4-alkoxy phenyl)-N'-(3-carboxy phenyl or 3-alkoxy phenyl)-phenyl sulfide-3,4,3', 4'-tetra carboxylic acid diimide, such as, N-(4-carboxy phenyl)-N'-(3-carboxy phenyl)-phenyl sulfide-3,4,3',4'-tetra carboxylic acid diimide, N-(4-methoxy carbonyl phenyl)-N' (3-methoxy carbonyl phenyl)-phenyl sulfide-3,4,3',4'-tetra carboxylic acid diimide, N-(4-carboxy phenyl)-N'-(3-methoxy carbonyl phenyl)-phenyl sulfide-3,4,3',4'-tetra carboxylic acid diimide; N-(4-carboxy phenyl or 4-alkoxy phenyl)-N'-(4-carboxy phenyl or 4-alkoxy phenyl)-phenyl sulfone-3,4,3',4'-tetra carboxylic acid diimide, such as, N,N'-bis(4-carboxy phenyl)phenyl sulfone 3,4,3',4'-tetra carboxylic acid diimide, N,N'-bis(4-methoxy carbonyl phenyl)-phenyl sulfone-3,4,3',4'-tetra carboxylic acid diimide, N,N'-bis(4-ethoxy carbonyl phenyl)-phenyl sulfone-3,4,3',4'-tetra carboxylic acid diimide, N-(4-carboxy phenyl)-N'-(4-methoxy carbonyl phenyl)-phenyl sulfone-3, 4,3',4'-tetra carboxylic acid diimide N-(3-carboxy phenyl or 3-alkoxy phenyl)-N'-(3-carboxy phenyl or 3-alkoxy phenyl) phenyl sulfone-3,4,3',4'-tetra carboxylic acid diimide, such as, N,N'-bis(3-carboxy phenyl)-phenyl sulfone-3,4,3',4'-tetra carboxylic acid diimide, N,N'-bis(3-methoxycarbonyl phenyl)-phenyl sulfone-3,4,3',4'-tetra carboxylic acid diimide, N,N'-bis(3-ethoxy carbonyl phenyl)-phenyl sulfone-3,4,3',4'-tetra carboxylic acid diimide, N-(3-carboxy phenyl)-N'-(3-methoxy carbonyl phenyl)-phenyl sulfone 3,4,3',4'-tetra carboxylic acid diimide; N-(4-carboxy phenyl or 4-alkoxy phenyl)-N'-(3-carboxy phenyl or 3-alkoxy phenyl)-phenyl sulfone-3,4,3',4'-tetra carboxylic acid diimide, such as, N-(4-carboxy phenyl)-N'-(3-carboxy phenyl)-phenyl sulfone-3,4,3',4'-tetra carboxylic acid diimide, N-(4-methoxy carbonyl phenyl)-N'(3-methoxy carbonyl phenyl) phenyl sulfone-3,4,3',4'-tetra carboxylic acid diimide, N-(4-carboxy phenyl)-N'-(3-methoxy carbonyl phenyl)-phenyl sulfone-3,4,3',4'-tetra carboxylic acid diimide.

Among these, in view of reactivity and heat-resistance, N,N'-bis(4-hydroxy phenyl) biphenyl-3,4,3',4'-tetra carboxylic acid diimide, N,N'-bis(4-acetoxy phenyl)-biphenyl-3,4,3',4'-tetra carboxylic acid diimide, N,N'-bis(4-propionyl oxy phenyl)-biphenyl-3,4,3',4'-tetra carboxylic acid diimide are preferable.

As examples of compound (IV'-2) or (IV'-3), following compounds may be mentioned, for example, 4,4'-bis(4-hydroxy phenyl amino carbonyl)-biphenyl-3,3'-dicarboxylic acid, 4,4'-bis(3-hydroxy phenyl amino carbonyl)-biphenyl-3,3'-dicarboxylic acid, 4,4'-bis(4-acetoxy phenyl amino carbonyl)-biphenyl 3,3'-dicarboxylic acid, 4,4'-bis(3-acetoxy phenyl amino carbonyl)-biphenyl-3,3'-dicarboxylic acid, 4-(4-hydroxy phenyl amino carbonyl)-4'-(3-hydroxy phenyl amino carbonyl)-biphenyl-3,3'-dicarboxylic acid, 3,4'-bis(4-hydroxy phenyl amino carbonyl)-biphenyl-4,3'-dicarboxylic acid, 3,4'-bis(3-hydroxy phenyl amino carbonyl)biphenyl-4,3'-dicarboxylic acid, 3,4'-bis(4-acetoxy phenyl amino carbonyl)-biphenyl-4,3'-dicarboxylic acid, 3,4'-bis(3-acetoxy phenyl amino carbonyl)-biphenyl-4,3'-dicarboxylic acid, 3'-(4-hydroxy phenyl amino carbonyl)-4'-(3-hydroxy phenyl amino carbonyl)-biphenyl-3,4'-dicarboxylic acid, 4,4'-bis(4-hydroxy phenyl amino carbonyl)-phenyl ether-3,3'-dicarboxylic acid, 4,4'-bis(3-hydroxy phenyl amino carbonyl)-phenyl ether-3,3'-dicarboxylic acid, 4,4'-bis(4-acetoxy phenyl amino carbonyl)-phenyl ether-3,3'-dicarboxylic acid, 4,4'-bis(3-acetoxy phenyl amino carbonyl)phenyl ether-3,3'-dicarboxylic acid, 4-(4-hydroxy phenyl amino carbonyl)4'-(3-hydroxy phenyl amino carbonyl)-phenyl ether-3,3'-dicarboxylic acid, 3,4'-bis(4-hydroxy phenyl amino carbonyl)-phenyl ether-4,3'-dicarboxylic acid, 3,4'-bis(3-hydroxy phenyl amino carbonyl)-phenyl ether-4,3'-dicarboxylic acid, 3,4'-bis(4-acetoxy phenyl amino carbonyl)-phenyl ether-4,3'-dicarboxylic acid, 3,4'-bis(3-acetoxy phenyl amino carbonyl)-phenyl ether-4,3'-dicarboxylic acid, 3'-(4-hydroxy phenyl amino carbonyl)-4'-(3-hydroxy phenyl amino carbonyl)-phenyl ether-3,4'-dicarboxylic acid, 4,4'bis(4-hydroxy phenyl amino carbonyl)-phenyl sulfide-3,3'-dicarboxylic acid, 4,4'-bis(3-hydroxy phenyl amino carbonyl)-phenyl sulfide-3,3-dicarboxylic acid, 4,4'-bis(4-acetoxy phenyl amino carbonyl)-phenyl sulfide-3,3'-dicarboxylic acid, 4,4'-bis(3-acetoxy phenyl amino carbonyl)phenyl sulfide-3,3'-dicarboxylic acid, 4-(4-hydroxy phenyl amino carbonyl)-4'-(3-hydroxy phenyl amino carbonyl)-phenyl sulfide-3,3'-dicarboxylic acid, 3,4'-bis(4-hydroxy phenyl amino carbonyl)-phenyl sulfide-4,3'-dicarboxylic acid, 3,4'-bis(3-hydroxy phenyl amino carbonyl)phenyl sulfide-4,3'-dicarboxylic acid, 3,4'-bis(4-acetoxy phenyl amino carbonyl)-phenyl sulfide-4,3'-dicarboxylic acid, 3,4'-bis(3-acetoxy phenyl amino carbonyl)-phenyl sulfide-4,3'-dicarboxylic acid, 3'-(4-hydroxy phenyl amino carbonyl)-4'-(3-hydroxy phenyl amino carbonyl)-phenyl sulfide-3,4'-dicarboxylic acid, 4,4'-bis(4-hydroxy phenyl amino carbonyl)phenyl sulfone-3,3'-dicarboxylic acid, 4,4'-bis(3-hydroxy phenyl amino carbonyl)-phenyl sulfone-3,3'-dicarboxylic acid, 4,4'-bis(4-acetoxy phenyl amino carbonyl)-phenyl sulfone-3,3'-dicarboxylic acid, 4,4'-bis(3-acetoxy phenyl amino carbonyl)-phenyl sulfone-3,3'-dicarboxylic acid, 4-(4-hydroxy phenyl amino carbonyl)-4'-(3-hydroxy phenyl amino carbonyl)phenyl sulfone-3,3'-dicarboxylic acid, 3,4'-bis(4-hydroxy phenyl amino carbonyl)-phenyl sulfone-4,3'-dicarboxylic acid, 3,4'-bis(3-hydroxy phenyl amino carbonyl)-phenyl sulfone-4,3'-dicarboxylic acid, 3,4'-bis(4-acetoxy phenyl amino carbonyl)-phenyl sulfone-4,3'-dicarboxylic acid, 3,4'-bis(3-acetoxy phenyl amino carbonyl)-phenyl sulfone-4,3'-dicarboxylic acid, 3'(4-hydroxy phenyl amino carbonyl)-4'-(3-hydroxy phenyl amino carbonyl)phenyl sulfone-3,4'-dicarboxylic acid.

4,4'-bis(4-carboxy phenyl amino carbonyl)-biphenyl-3,3'-dicarboxylic acid, 4,4'-bis(3-carboxy phenyl amino carbonyl)-biphenyl-3,3'-dicarboxylic acid, 4,4'-bis(4-methoxycarbonyl phenyl amino carbonyl)-biphenyl-3,3'-dicarboxylic acid, 4,4'-bis(3-methoxycarbonyl phenyl amino carbonyl)-biphenyl-3,3'-dicarboxylic acid, 4-(4-carboxy phenyl amino carbonyl)-4'-(3-carboxy phenyl amino carbonyl)-biphenyl -3,3'-dicarboxylic acid, 3,4'-bis(4-carboxy phenyl amino carbonyl)biphenyl-4,3'-dicarboxylic acid, 3,4-bis(3-carboxy phenyl amino carbonyl)biphenyl-4,3'-dicarboxylic acid, 3,4'-bis(4-methoxycarbonyl phenyl amino carbonyl)-biphenyl-4,3'-dicarboxylic acid, 3,4'-bis(3-methoxycarbonyl phenyl amino carbonyl)-biphenyl-4,3'-dicarboxylic acid, 3'-(4-carboxy phenyl amino carbonyl)-4'-(3-carboxy phenyl amino carbonyl)-biphenyl -3,4'-dicarboxylic acid, 4,4'-bis(4-carboxy phenyl amino carbonyl)-phenyl ether-3,3'-dicarboxylic acid, 4,4'-bis(3-carboxy phenyl amino carbonyl)phenyl ether-3,3'-dicarboxylic acid, 4,4'-bis(4-methoxycarbonyl phenyl amino carbonyl)-phenyl ether-3,3'-dicarboxylic acid, 4,4'-bis(3-methoxycarbonyl phenyl amino carbonyl)-phenyl ether-3,3'-dicarboxylic acid, 4-(4-carboxy phenyl amino carbonyl)-4'-(3-carboxy phenyl amino carbonyl)-phenyl ether-3,3'-dicarboxylic acid, 3,4'-bis(4-carboxy phenyl amino carbonyl)-phenyl ether-4,3'-dicarboxylic acid, 3,4'-bis(3-carboxy phenyl amino carbonyl)-phenyl ether-4,3'-dicarboxylic acid, 3,4'-bis(4-methoxy carbonyl phenyl amino carbonyl)-phenyl ether-4,3'-dicarboxylic acid, 3,4'-bis(3-methoxycarbonyl phenyl amino carbonyl) phenyl ether-4,3'-dicarboxylic acid, 3'-(4-carboxy phenyl amino carbonyl)-4'-(3-carboxy phenyl amino carbonyl)-phenyl ether 3,4'-dicarboxylic acid, 4,4'-bis(4-carboxy phenyl amino carbonyl)-phenyl sulfide-3,3'-dicarboxylic acid, 4,4'-bis(3-carboxy phenyl amino carbonyl)-phenyl sulfide-3,3'-dicarboxylic acid, 4,4'-bis(4-methoxycarbonyl phenyl amino carbonyl)-phenyl sulfide-3,3'-dicarboxylic acid, 4,4'-bis(3-methoxycarbonyl phenyl amino carbonyl)-phenyl sulfide-3,3'-dicarboxylic acid, 4-(4-carboxy phenyl amino carbonyl)-4'-(3-carboxy phenyl amino carbonyl)-phenyl sulfide-3,3'-dicarboxylic acid, 3,4'-bis(4-carboxy phenyl amino carbonyl)-phenyl sulfides 4,3'-dicarboxylic acid, 3,4'-bis(3-carboxy phenyl amino carbonyl)phenyl sulfides-4,3'-dicarboxylic acid, 3,4'-bis(4-methoxycarbonyl phenyl amino carbonyl)-phenyl sulfides-4,3'-dicarboxylic acid, 3,4'-bis(3-methoxycarbonyl phenyl amino carbonyl)-phenyl sulfide-4,3'-dicarboxylic acid, 3'-(4-carboxy phenyl amino carbonyl)-4'-(3-carboxy phenyl amino carbonyl)-phenyl sulfide-3,4'-dicarboxylic acid, 4,4'-bis(4-carboxy phenyl amino carbonyl)-phenyl sulfone-3,3'-dicarboxylic acid, 4,4'-bis(3-carboxy phenyl amino carbonyl)-phenyl sulfone-3,3'-dicarboxylic acid, 4,4'-bis(4-methoxycarbonyl phenyl amino carbonyl)-phenyl sulfone-3,3'-dicarboxylic acid, 4,4'-bis(3-methoxycarbonyl phenyl amino carbonyl)-phenyl sulfone -3,3'-dicarboxylic acid, 4'(4-carboxy phenyl amino carbonyl)-4'-(3-carboxy phenyl amino carbonyl)-phenyl sulfone-3,3'-dicarboxylic acid, 3,4'-bis(4-carboxy phenyl amino carbonyl)-phenyl sulfone-4,3'-dicarboxylic acid, 3,4'-bis(3-carboxy phenyl amino carbonyl)-phenyl sulfone-4,3'-dicarboxylic acid, 3,4'-bis(4-methoxy carbonyl phenyl amino carbonyl)phenyl sulfone-4,3'-dicarboxylic acid, 3,4'-bis(3-methoxy carbonyl phenyl amino carbonyl)-phenyl sulfone-4,3'-dicarboxylic acid, 3'-(4-carboxy phenyl amino carbonyl)-4'-(3-carboxy phenyl amino carbonyl)-phenyl sulfone-3,4'-dicarboxylic acid, etc. may be mentioned.

These compounds may be used independently, or in combination of two or more kinds of them.

Among them, in view of reactivity, availability, and heat resistance, 4,4'-bis(4-hydroxy phenyl amino carbonyl)-biphenyl-3,3'-dicarboxylic acid, 4,4'-bis(4-acetoxy phenyl amino carbonyl) biphenyl-3,3'-dicarboxylic acid, 3,4'-bis(4- hydroxy phenyl amino carbonyl)biphenyl-4,3'-dicarboxylic acid, and 3,4'-bis(4-acetoxy phenyl amino carbonyl)-biphenyl-4,3'-dicarboxylic acid are preferable.

The above-mentioned compound (IV'-2) or (IV'-3) is obtained by reacting a compound represented by a formula (A)

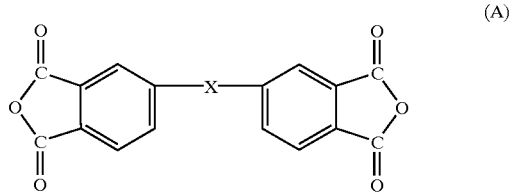

(X represents direct bond, —O—, —S—, and $SO_2$—), with a compound represented by a general formula (B).

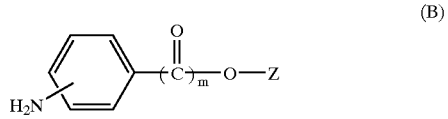

(in the formula, m represents 0 or 1, Z represents the same group as the above-mentioned $Z_4$ or $Z_5$, and, amino group is located in para-position or

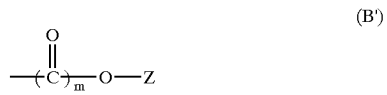

meta position to above group (B').).

As a compound (B), for example, p- or m-aminophenol, p- or m-acyloxy aniline, p- or m-aminobenzoic acid or an ester thereof, etc. may be mentioned.

A compound (IV'-1) may be obtained by dehydrating and cyclizing (imide cyclization) a compound (IV'-2) or (IV'-3) produced by the above-mentioned method. In addition, a compound (IV'-2) or (IV'-3) may be obtained by hydrolyzing a compound (IV'-1).

A reaction of the above-mentioned compound (A) and (B) easily proceed by mixing both components preferably in a state of solution to form a compound (IV'-2) or (IV'-3). A reaction temperature of the reaction is usually –50 to 200° C., and is preferably 50 to 150° C.

Various methods may be used in dehydration and cyclization of the compound (IV'-2) or (IV'-3). For example, following methods may be mentioned:

(1) a method in which cyclodehydration is performed under coexistence of carboxylic acid anhydride;
(2) a method in which cyclodehydration is performed by inorganic acid or condensate thereof having dehydrating ability;
(3) a method in which in the presence of acid catalyst cyclodehydration is performed in azeotropic state;
(4) a method in which cyclization is performed using special dehydrating agent;
(5) cyclodehydration method by heating.

A compound (IV'-2) or (IV'-3) whose $Z_4$ and $Z_5$ are groups other than hydrogen atom may be obtained using a compound having a corresponding groups, respectively, as a raw material, or it may be derived from a compound whose $Z_4$ and $Z_5$ are both hydrogen atoms.

Usually, reactions of the above-mentioned compounds (I'), (II'), and (III') and {(IV'-1), (IV'-2), or (IV'-3)} are performed at temperature of from 100 to 400° C., and preferably from 200 to 350° C.

A reaction time is usually adjusted by a melt viscosity of resulting polyimide esters, and is approximately several minutes to several tens of hours, and in order to restrain degradation of obtained polyimide esters, it is preferable in a range of several minutes to several hours.

Although catalysts are not necessarily required for the above-mentioned reaction, a suitable polymerization catalyst, such as sodium acetate, potassium acetate, pyridine, N-methyl imidazole, antimony trioxide, etc. may be added.

In an adding order of reaction raw materials, all of reaction raw materials may be mixed in a first stage, and, for example, a compound (I'); and a mixture of a compound (II') and (III'), and ((IV'-1), (IV'-2), or (IV'-3)) may be reacted.

In addition, although the above-mentioned reaction is usually performed without using special solvents, if necessary; suitable solvent may be used.

As in the method described above, a polyimide ester of the present invention can be produced, and furthermore, after-treatments, such as well-known refining processing, can be performed for this polyimide ester to obtain a desired purity.

A polyimide ester of the present invention can be injection-molded at usual molding temperatures (no more than 400° C.), and moreover, any molding methods used for general thermoplastic resins, such, as extrusion molding, compression molding, and spinning, can be applicable. Molded goods may be heat-treated at suitable temperature and in suitable period. Since a polyimide ester of the present invention has a small coefficient of linear expansion and small water absorbing property, and also has excellent heat resistance, it can be suitably used as a material of various fields, such as precision injection-molded products for electricity and electronic parts, filament, film, sheet, etc.

EXAMPLES

Although hereinafter the present invention will be described based on Examples, it is not intended to be any limitation for the present invention.

Synthetic Example 1

In dehydrated DMF 500 ml, 3,4,3',4'-biphenyl-tetra carboxylic acid dianhydride 29.9 g (0.1 moles) and 4-aminophenol 21.8 g (0.2 moles) were agitated at 80° C. for 4 hours. Then, after acetic anhydride 51.1 g (0.5 moles) and pyridine 10 ml were added, obtained mixture was agitated at 120° C. for further 4 hours. Obtained reactant was dropped into water 2.5 L, and it was agitated for 1.5 hours. Then, after it was filtered and being rinsed with water 0.5 L, resulting precipitate was dried at 50° C. under reduced pressure overnight. A melting point measured of obtained imide compound showed 355° C.

Example 1

Into a reactor equipped with a agitator, a torque meter, a nitrogen gas introducing pipe, a thermometer, and a reflux condenser, p-hydroxybenzoic acid 66.3 g, 4,4'-dihydroxy biphenyl 14.9 g, terephthalic acid 26.6 g, 44.8 g of imide compounds obtained in the synthetic example 1, and acetic anhydride 89.8 g were introduced. After inside of the reactor was fully substituted by nitrogen atmosphere, temperature was raised up to 150° C. over 15 minutes under nitrogen gas flow, and in a state the temperature was held, the reaction mixture was relfuxed for 3 hours.

Then, as by-product of acetic acid and unreacted acetic anhydride were being distilled off, a temperature of the reaction mixture was raised up to 320° C. over 2 hours and 50 minutes, and recognition of torque rising showed a reaction end point and content was removed out. Obtained solid content was cooled to room temperature. After the solid content was ground by a rough grinder, temperature was raised over 1 hour under nitrogen atmosphere from room temperature to 250° C. Furthermore, temperature was raised over 5 hours from 250° C. to 320° C., and held at 320° C. for 3 hours to promote polymerization reaction in solid phase. A melting point of the obtained resin measured showed 379° C.

Obtained resin was compression molded to give a disk-like specimen with a diameter of 1 cm and a thickness of 3 mm under conditions of 50 kg/cm²1 load and 350° C. After the specimen was kept standing for 168 hours under conditions of 85° C./85% humidity, it was measured for water absorption to give 0.2%. Moreover, the disk-like specimen was measured for a coefficient of linear expansion at 50 to 100° C. to give 87 ppm/° C.

Comparative Example 1

Into a reactor equipped with a stirrer, a torque meter, a nitrogen gas introducing pipe, a thermometer, and a reflux condenser, p-hydroxybenzoic acid 760 g, 4,4'-dihydroxy biphenyl 512 g, terephthalic acid 434, isophthalic acids 23 g, and acetic anhydride 1235 g were introduced. After inside of the reactor was fully substituted by nitrogen atmosphere, temperature was raised up to 150° C. over 15 minutes under nitrogen gas flow, and in a state the temperature was held, the reaction mixture was refluxed for 3 hours.

Then, as by-product of acetic acid and unreacted acetic anhydride were being distilled off, a temperature of the reaction mixture was raised up to 320° C. over 2 hours and 50 minutes, and recognition of torque rising showed a reaction end point and content was removed out. Obtained solid content was cooled to room temperature. After the solid content was ground by a rough grinder, temperature was raised over 1 hour under nitrogen atmosphere from room temperature to 250° C. Furthermore, temperature was raised over 5 hours from 250° C. to 320° C., and held at 320° C. for 3 hours to promote polymerization reaction in solid phase. A melting point of the obtained resin measured showed 372° C.

Obtained resin was compression molded to give a disk-like specimen with a diameter of 1 cm and a thickness of 3 mm under conditions of 50 kg/cm² load and 350° C. After the specimen was kept standing for 168 hours under conditions of 85° C./185% humidity; it was measured for water absorption to give 0.11%. Moreover, the disk-like specimen was measured for a coefficient of linear expansion at 50 to 100° C. to give 143 ppm/° C.

Comparative Example 2

A thermoplastic polyimide resin manufactured by Mitsui Chemicals, Inc. (Aurum) was compression molded to give a disk-like specimen with a diameter of 1 cm and a thickness of 3 mm under conditions of 50 kg/cm² load and 350° C. After the specimen was kept standing for 168 hours under conditions of 85° C./85% humidity; it was measured for water absorption to give 0.53%. Moreover, the disk-like specimen was measured for a coefficient of linear expansion at 50 to 100° C. to give 42 ppm/° C.

Since an aromatic polyimide ester of the present invention has a small coefficient of linear expansion and small water absorbing property and has outstanding heat resistance, it may be used suitably for uses, such as electricity and electronic parts.

What is claimed is:
1. An aromatic polyimide ester comprising:
a repeating unit represented by a following formula (I),

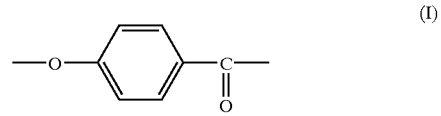

(I)

a repeating unit represented by a following formula (II),

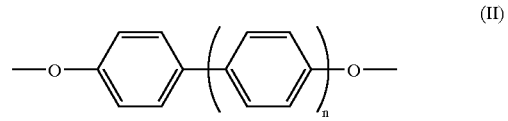

(II)

(n represents 0 or 1)
a repeating unit represented by a following formula (III),

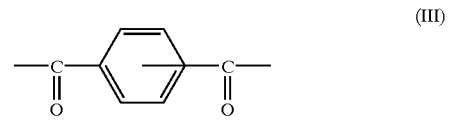

(III)

and a repeating unit represented by a following formula (IV),

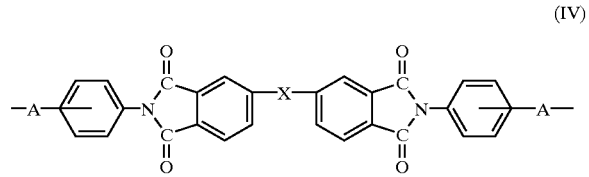

(IV)

(-A- represents —O— or —CO—, and is located in para-position or meta position to imido group, and X represents direct coupling, —O—, —S—, or $SO_2$.)
and the said repeating units mutually bonded with each other through ester-bonds.

2. The aromatic polyimide ester according to claim 1, wherein the aromatic polyimide is produced by reacting
a compound represented by a following formula (I'),

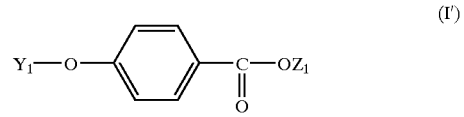

(I')

($Y_1$ represents a hydrogen atom or $R_1$CO-{where $R_1$ represents a hydrocarbon group with carbon numbers of 1 to 4}, $Z_1$ represents a hydrogen atom or a hydrocarbon group with carbon numbers of 1 to 4)
a compound represented by a following formula (II'),

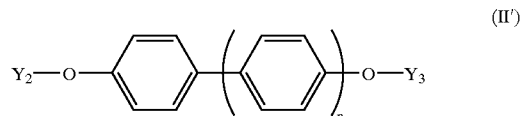

(II')

(n represents 0 or 1, $Y_2$ represents a hydrogen atom or $R_2$CO— {where $R_2$ represents a hydrocarbon group with a carbon number of 1 to 4}, $Y_3$ represents a hydrogen atom or R₃CO— {where R₃ represents a hydrocarbon group with carbon numbers of 1 to 4})

a compound represented by a following formula (III'),

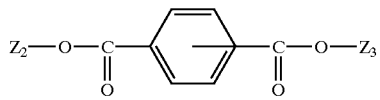

(III')

(Z₂ and Z₃ represent independently a hydrogen atom or a hydrocarbon group with carbon numbers of 1 to 4 respectively, and Z₃—O— CO-group is located in para-position or in meta position to Z₂—O—CO-group)

and a compound represented by a following formula (IV'-1), (IV'-2), or (IV'-3)

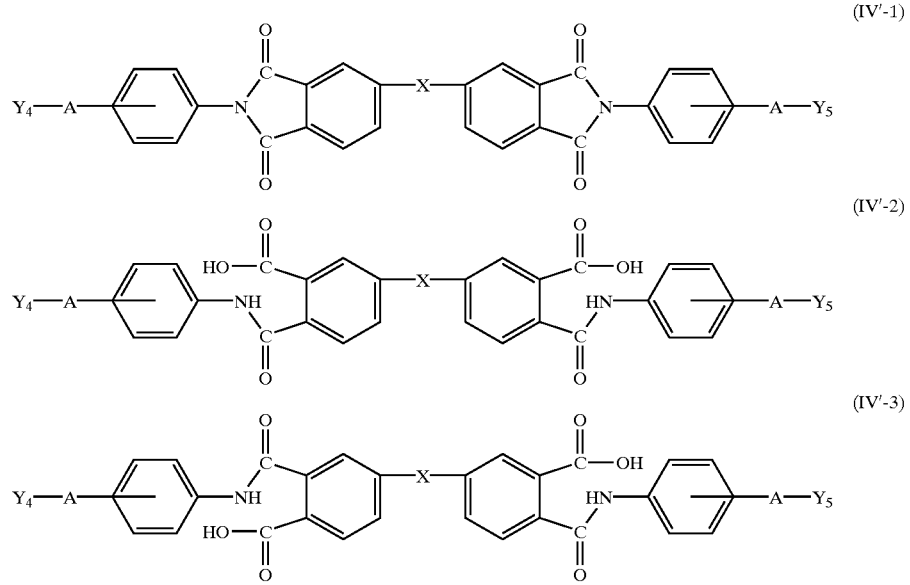

($Y_4$ presents a hydrogen atom or R₄CO-{where R₄ represents a hydrocarbon group with carbon numbers of 1 to 4}, $Y_5$ represents a hydrogen atom or R₅CO— (where R₅ represents a hydrocarbon group with carbon numbers of 1 to 4), and $Y_4$-A-group is located in para-position to $Y_5$-A-group).

3. A method for producing an aromatic polyimide ester comprising a compound represented by a following formula (I'),

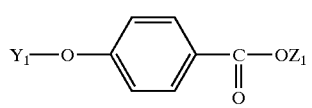

(I')

($Y_1$ represents a hydrogen atom or R₁CO— {where R₁ represents a hydrocarbon group with carbon numbers of 1 to 4), $Z_1$ represents a hydrogen atom or a hydrocarbon group with carbon numbers of 1 to 4)

a compound represented by a following formula (II'),

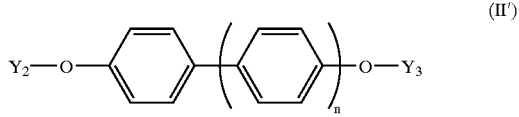

(II')

(n represents 0 or 1, $Y_2$ represents a hydrogen atom or R₂CO— {where R₂ represents a hydrocarbon group with a carbon number of 1 to 4}, $Y_3$ represents a hydrogen atom or R₃CO— {where R₃ represents a hydrocarbon group with carbon numbers of 1 to 4}), a compound represented by a following formula (III'),

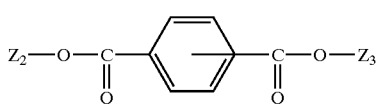

(III')

(Z₂ and Z₃ represent independently a hydrogen atom or a hydrocarbon group with carbon numbers of 1 to 4 respectively, and Z₃-0CO-group is located in para-position or in meta position to Z₂—O—CO-group)

and a compound represented by a following formula (IV'-1), (IV'-2), or (IV'-3).

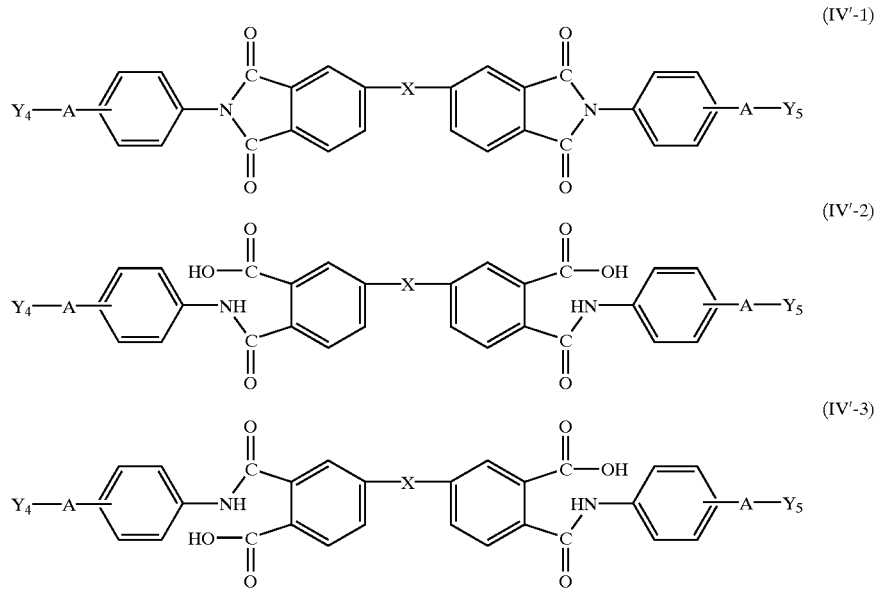

($Y_4$ represents a hydrogen atom or $R_4$CO-{where $R_4$ represents a hydrocarbon group with carbon numbers of 1 to 4}, $Y_5$ represents a hydrogen atom or $R_5$CO— (where $R_6$, represents a hydrocarbon group with carbon numbers of 1 to 4), and $Y_4$-A-group is located in para-position or in meta position to $Y_5$-A-group).

4. The aromatic polyimide ester according to claim 1, wherein mole ratios of repeating units represented by formulas (I), (II), (III), and (IV) satisfy from 30/70 to 90/10 of (I)/((II)+(III)+(IV)), and from 0.1/99.9 to 30/70 of (IV)/{(I')+(II')+(III')}.

5. The aromatic polyimide ester according to claim 2, wherein mole ratios of compounds represented with formulas (I'), (II'), (III'), (IV'-1, (IV'-2), and (IV'-3) satisfy from 30/70 to 90/10 of (I')/[(II')+(III') +{any of (IV'-2), or (IV'-3)}], and from 0.1/99.9 to 30/70 of {any one of (IV'-1), (IV'-2), or (IV'-3)}/{(I')+(II')+(III')}.

6. A method for manufacturing according to claim 3, wherein mole ratios of compounds represented by formulas (I') (II'), (III'), (IV'-1), (IV'-2) and (IV-3) satisfy from 30/70 to 90/10 of (I')/((II')+{any one of (IV'-1), (IV'-2), or (IV'-3)}1, and from 0.1/99.9 to 30/70 of {any one of (IV'-1), (IV'-2), or (IV'-3)}/{(I')+(II')+(III')}.

* * * * *